United States Patent
Goji et al.

(10) Patent No.: US 10,279,234 B2
(45) Date of Patent: May 7, 2019

(54) GOLF CLUB GRIP AND GOLF CLUB

(71) Applicants: Dunlop Sports Co. Ltd., Kobe-shi, Hyogo (JP); Sumitomo Rubber Industries, Ltd., Kobe-shi, Hyogo (JP)

(72) Inventors: Sho Goji, Kobe (JP); Kazuyoshi Shiga, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 21 days.

(21) Appl. No.: 15/674,687

(22) Filed: Aug. 11, 2017

(65) Prior Publication Data

US 2018/0043224 A1 Feb. 15, 2018

(30) Foreign Application Priority Data

Aug. 12, 2016 (JP) .................. 2016-158539

(51) Int. Cl.
*A63B 60/08* (2015.01)
*A63B 53/14* (2015.01)
*C08K 3/36* (2006.01)
*C08K 5/548* (2006.01)
*C08K 7/18* (2006.01)
*C08K 7/26* (2006.01)
*C08L 7/00* (2006.01)
*C08L 15/00* (2006.01)
*A63B 102/32* (2015.01)

(52) U.S. Cl.
CPC .............. *A63B 60/08* (2015.10); *A63B 53/14* (2013.01); *C08K 3/36* (2013.01); *C08K 5/548* (2013.01); *C08K 7/18* (2013.01); *C08K 7/26* (2013.01); *C08L 7/00* (2013.01); *C08L 15/005* (2013.01); *A63B 2102/32* (2015.10); *A63B 2209/00* (2013.01); *C08K 2201/005* (2013.01); *C08L 2205/03* (2013.01)

(58) Field of Classification Search
CPC ..... A63B 60/08; A63B 53/14; A63B 2102/32; C08K 7/18; C08K 3/36; C08K 5/548; C08K 7/26; C08L 7/00
USPC ........................................................ 523/149
See application file for complete search history.

(56) References Cited

U.S. PATENT DOCUMENTS 4,552,713 A * 11/1985 Cavicchioli ............ A63B 53/14
264/162
2015/0322245 A1 11/2015 Mikura et al.

FOREIGN PATENT DOCUMENTS

JP 2002-282403 A 10/2002

* cited by examiner

*Primary Examiner* — Hui H Chin
(74) *Attorney, Agent, or Firm* — Birch, Stewart, Kolasch & Birch, LLP

(57) ABSTRACT

An object of the present invention is to provide a golf club grip having excellent grip performance under a wet condition. The present invention provides a golf club grip having an outermost surface layer, wherein the outermost surface layer contains (A) a crosslinked rubber and (B) a silica, and has, at at least a part thereof, a region where a spherical silica secondary particle with a particle size of 3 μm or more exists in an amount of at least two particles/mm$^2$. If a spherical silica secondary particle with a particle size of 3 μm or more exists in a given amount at at least a part of the outermost surface layer, the golf club grip has an improved grip performance under a wet condition.

20 Claims, 3 Drawing Sheets

GOLF CLUB GRIP AND GOLF CLUB

FIELD OF THE INVENTION

The present invention relates to a golf club grip.

DESCRIPTION OF THE RELATED ART

As a grip provided on a golf club, a grip made from a rubber is widely used. As the grip made from the rubber, a golf club grip using an acrylonitrile-butadiene based rubber as a base rubber and showing improved tensile strength or abrasion resistance has been proposed. For example, U.S. 2015/0322245 A1 discloses a golf club grip formed from a rubber composition comprising a base rubber and a cross-linking agent, wherein the base rubber contains a hydrogenated acrylonitrile-butadiene rubber and/or a carboxyl-modified acrylonitrile-butadiene rubber (refer to claim 1, paragraphs 0004 and 0005 of U.S. 2015/0322245 A1).

In addition, it has been proposed to blend a silica particle and a silane coupling agent or silylating agent to enhance anti-slipping performance of a grip against rainwater or sweat. For example, JP 2002-282403 A discloses a golf club grip formed from a polymer composition, wherein the polymer composition contains a base polymer and a silica with a primary particle size of 5 nm or more and 30 nm or less, and an amount of the silica is 5 parts or more and 50 parts or less with respect to 100 parts of the base polymer (refer to claim 2, paragraphs 0008, 0009, 0036 of JP 2002-282403 A).

SUMMARY OF THE INVENTION

Conventionally, it has been proposed to blend a silica particle in a golf club grip. However, the silica particle blended in the conventional golf club grip has a relatively small particle size, and is blended for a purpose of improving strength or abrasion resistance of the grip. Thus, no improvement in the anti-slipping performance of the grip is shown by using the conventional silica particle, and there still remains room for improvement in the grip performance under a wet condition. The present invention has been made in view of the abovementioned circumstances, and an object of the present invention is to provide a golf club grip having excellent grip performance under a wet condition.

The present invention that has solved the above problems provides a golf club grip having an outermost surface layer, wherein the outermost surface layer contains (A) a crosslinked rubber and (B) a silica, and has a region where a spherical silica secondary particle with a particle size of 3 μm or more exists in an amount of at least two particles/mm$^2$ at least in part of the outermost surface layer. The region where a spherical silica secondary particle with a particle size of 3 μm or more exists in a larger amount has excellent anti-slipping performance under a wet condition. Thus, if the outermost surface layer includes the region where a spherical silica secondary particle with a particle size of 3 μm or more exists in a larger amount at least in part of the outermost surface layer, the golf club grip has improved grip performance under a wet condition.

The present invention also provides a golf club comprising a shaft, a head provided on one end of the shaft, and a grip provided on another end of the shaft, wherein the grip is the abovementioned golf club grip.

According to the present invention, a golf club grip having excellent grip performance under a wet condition is obtained.

DESCRIPTION OF THE PREFERRED EMBODIMENT

Figure 1:
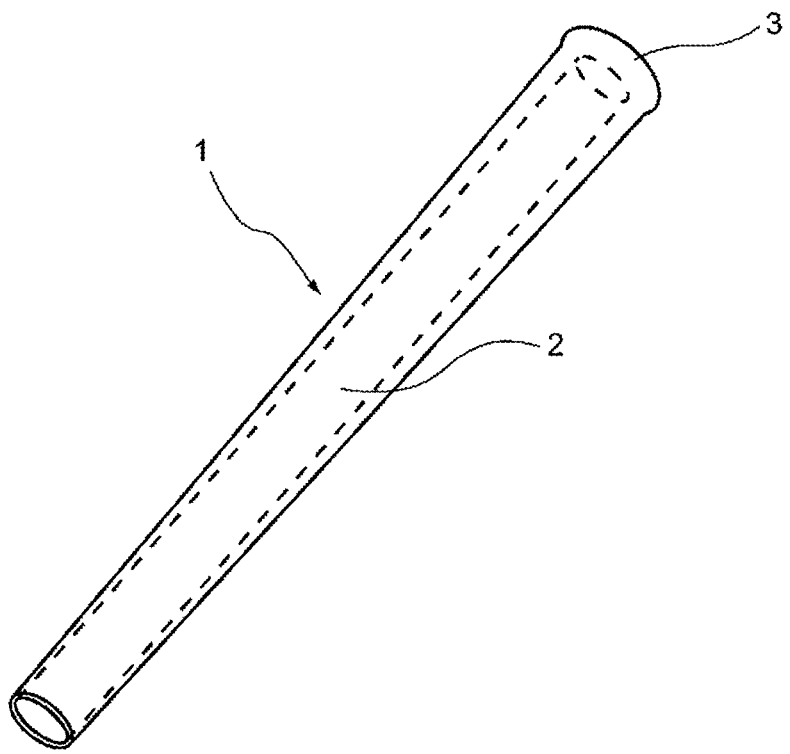
FIG. 1 is a perspective view showing one example of a golf club grip.

The present invention provides a golf club grip having an outermost surface layer, wherein the outermost surface layer contains (A) a crosslinked rubber and (B) a silica, and has a region (hereinafter, sometimes referred to as "spherical particle existing region") where a spherical silica secondary particle with a particle size of 3 μm or more exists in an amount of at least two particles/mm$^2$ at least in part of the outermost surface layer. The spherical particle existing region has excellent anti-slipping performance under a wet condition by the action of the spherical silica secondary particle. Thus, if the outermost surface layer has the spherical particle existing region at least in part of the outermost surface layer, the golf club grip has improved grip performance under a wet condition.

[Outermost Surface Layer]

The golf club grip has the spherical particle existing region at least in part of the outermost surface layer thereof. Herein, the outermost surface layer means an outermost layer of the grip, i.e. a layer touched by the user when using the grip. It is preferred that the golf club grip has the spherical particle existing region at least in part of the area touched by the user when using the grip. The area ratio of the spherical particle existing region on the outermost surface layer of the golf club grip is preferably 50 area % or more, more preferably 70 area % or more, and even more preferably 90 area % or more. Further, it is also preferred that the whole area of the outermost surface layer of the golf club grip is the spherical particle existing region. It is noted that, when the golf club grip has a cylindrical portion which will be described later, the whole area of the outermost surface layer of the cylindrical portion is preferably the spherical particle existing region.

The spherical silica secondary particle with a particle size of 3 μm or more exists in the spherical particle existing region in an amount of 2 particles or more/mm$^2$, preferably 3 particles or more/mm$^2$, more preferably 6 particles or more/mm$^2$, and preferably 2500 particles or less/mm$^2$, more preferably 2300 particles or less/mm$^2$, even more preferably 2000 particles or less/mm$^2$. If the spherical silica secondary particle with a particle size of 3 μm or more exists in an amount of 2 particles or more/mm$^2$, the grip has improved anti-slipping performance, and if the spherical silica secondary particle with a particle size of 3 μm or more exists in an amount of 2500 particles or less/mm$^2$, the grip can maintain light weight and flexibility. It is noted that the particle number of the spherical silica secondary particle with a particle size of 3 μm or more can be confirmed by observing the outermost surface layer with a scanning electron microscope. The spherical silica secondary particle preferably has a sphericity of 0.90 or more, more preferably 0.92 or more, and even more preferably 0.95 or more. It is noted that the sphericity means a ratio (shortest diameter/ longest diameter) of the shortest diameter of the particle to the longest diameter of the particle. The particle size of the spherical silica particle in the spherical particle existing region means the longest diameter of the particle, and preferably ranges from 3 μm to 25 μm.

The outermost surface layer contains (A) a crosslinked rubber and (B) a silica. Examples of the base rubber constituting (A) the crosslinked rubber include natural rubber (NR), ethylene-propylene-diene rubber (EPDM), butyl rubber (IIR), acrylonitrile-butadiene rubber (NBR), hydrogenated acrylonitrile-butadiene rubber (HNBR), carboxyl-modified acrylonitrile-butadiene rubber (XNBR), butadiene rubber (BR), styrene-butadiene rubber (SBR), polyurethane rubber (PU), isoprene rubber (IR), chloroprene rubber (CR), ethylene-propylene rubber (EPM) and the like. These base rubbers may be used solely, or two or more of them may be used in combination.

(B) The silica is not particularly limited, as long as the silica at least contains the spherical silica secondary particle with a particle size of 3 μm or more. The amount of (B) the silica in the outermost surface layer is preferably 1 part by mass or more, more preferably 5 parts by mass or more, and even more preferably 8 parts by mass or more, and is preferably 30 parts by mass or less, more preferably 25 parts by mass or less, and even more preferably 20 parts by mass or less, with respect to 100 parts by mass of the base rubber constituting (A) the crosslinked rubber. If the amount of (B) the silica is 1 part by mass or more, the grip has further enhanced anti-slipping performance, and if the amount of (B) the silica is 30 parts by mass or less, the grip can keep light weight.

The tan δ of the outermost surface layer is preferably 1.15 or more, more preferably 1.20 or more, and even more preferably 1.25 or more, and is preferably 3.0 or less, more preferably 2.5 or less, and even more preferably 2.0 or less. If the tan δ is 1.15 or more, the grip has better anti-slipping performance under a wet condition, and if the tan δ is 3.0 or less, the grip is more flexible. The tan δ of the outermost surface layer can be adjusted according to the amount of (B) the silica, the amount of the silane coupling agent which will be described later, or the like, in the outermost surface layer.

The outermost surface layer is preferably formed from a surface layer rubber composition containing (a) a base rubber, (b) spherical silica secondary particles and (c) a silane coupling agent. If the outermost surface layer is formed from the surface layer rubber composition, the spherical particle existing region can be easily formed.

It is preferred that at least a part of the portion of the golf club grip touched by the user when using the grip is formed from the surface layer rubber composition. Further, the whole outermost surface layer of the golf club grip may be formed from the surface layer rubber composition. It is noted that, when the golf club grip has a cylindrical portion which will be described later, the whole outermost surface layer of the cylindrical portion is preferably formed from the surface layer rubber composition.

(a) Base Rubber

Examples of the base rubber include natural rubber (NR), ethylene-propylene-diene rubber (EPDM), butyl rubber (IIR), acrylonitrile-butadiene rubber (NBR), hydrogenated acrylonitrile-butadiene rubber (HNBR), carboxyl-modified acrylonitrile-butadiene rubber (XNBR), butadiene rubber (BR), styrene-butadiene rubber (SBR), polyurethane rubber (PU), isoprene rubber (IR), chloroprene rubber (CR), ethylene-propylene rubber (EPM) and the like. These base rubbers may be used solely, or two or more of them may be used in combination.

(a) The base rubber preferably contains an acrylonitrile-butadiene based rubber. Examples of the acrylonitrile-butadiene based rubber include acrylonitrile-butadiene rubber (NBR), carboxyl-modified acrylonitrile-butadiene rubber (XNBR), hydrogenated acrylonitrile-butadiene rubber (HNBR), and carboxyl-modified hydrogenated acrylonitrile-butadiene rubber (HXNBR). The XNBR means a copolymer composed of a monomer having a carboxyl group, acrylonitrile and butadiene. The HNBR means a hydrogenated product of the acrylonitrile-butadiene rubber. The HXNBR means a hydrogenated product of a copolymer composed of a monomer having a carboxyl group, acrylonitrile and butadiene.

The amount of the acrylonitrile-butadiene based rubber in (a) the base rubber is preferably 50 mass % or more, more preferably 60 mass % or more, and even more preferably 70 mass % or more. Further, it is also preferred that (a) the base rubber of the surface layer rubber composition consists of the acrylonitrile-butadiene based rubber.

The amount of the acrylonitrile in the NBR, XNBR, HNBR or HXNBR is preferably 15 mass % or more, more preferably 18 mass % or more, and even more preferably 21 mass % or more, and is preferably 50 mass % or less, more preferably 45 mass % or less, and even more preferably 40 mass % or less. If the amount of the acrylonitrile is 15 mass % or more, the grip has better abrasion resistance, and if the amount of the acrylonitrile is 50 mass % or less, the grip has better touch feeling in a cold region or in winter.

The amount of the double bond in the HNBR or HXNBR is preferably 0.09 mmol/g or more, more preferably 0.2 mmol/g or more, and is preferably 2.5 mmol/g or less, more preferably 2.0 mmol/g or less, and even more preferably 1.5 mmol/g or less. If the amount of the double bond is 0.09 mmol/g or more, vulcanization is easily carried out during molding and the grip has enhanced tensile strength, and if the amount of the double bond is 2.5 mmol/g or less, the grip has better durability (weather resistance) and tensile strength. The amount of the double bond can be adjusted according to the amount of the butadiene in the copolymer or the amount of hydrogen added into the copolymer.

Examples of the monomer having a carboxyl group in the XNBR or HXNBR include acrylic acid, methacrylic acid, fumaric acid, maleic acid and the like. The amount of the monomer having a carboxyl group in the XNBR or HXNBR is preferably 1.0 mass % or more, more preferably 2.0 mass % or more, and even more preferably 3.5 mass % or more, and is preferably 30 mass % or less, more preferably 25 mass % or less, and even more preferably 20 mass % or less. If the amount of the monomer having a carboxyl group is 1.0 mass % or more, the grip has better abrasion resistance, and if the amount of the monomer having a carboxyl group is 30 mass % or less, the grip has better touch feeling in a cold region or in winter.

The amount of the carboxyl group in the XNBR or HXNBR is preferably 1.0 mass % or more, more preferably 2.0 mass % or more, and even more preferably 3.5 mass % or more, and is preferably 30 mass % or less, more preferably 25 mass % or less, and even more preferably 20 mass % or less. If the amount of the carboxyl group is 1.0 mass % or more, the grip has better abrasion resistance, and if the amount of the carboxyl group is 30 mass % or less, the grip has better touch feeling in a cold region or winter.

(b) Spherical Silica Secondary Particle (b) The spherical silica secondary particles are spherical or roughly spherical, and have an average sphericity of 0.9 or more. It is noted that the average sphericity means a value obtained by averaging the sphericity of each particle. Such (b) the spherical silica secondary particles have stronger mechanical strength and are hardly broken when kneading or molding the rubber composition, thus a larger amount of the spherical silica secondary particles with a particle size of 3 µm or more can be remained in the molded grip. As a result, the spherical particle existing region can be easily formed, and improvement effect in the anti-slipping performance is higher.

The average sphericity of (b) the spherical silica secondary particles is preferably 0.90 or more, more preferably 0.92 or more, and even more preferably 0.95 or more. If the average sphericity is 0.90 or more, (b) the spherical silica secondary particles have better dispersibility in the base rubber. It is noted that the upper limit of the average sphericity is 1.0. The method for measuring the average sphericity will be described later.

The number average particle size of (b) the spherical silica secondary particles is preferably 1 µm or more, more preferably 2 µm or more, and even more preferably 3 µm or more, and is preferably less than 63 µm, more preferably 25 µm or less, even more preferably 20 µm or less, and most preferably 10 µm or less. If the number average particle size is 1 µm or more, (b) the spherical silica secondary particles have better handling property, and if the number average particle size is less than 63 µm, poor dispersion of (b) the spherical silica secondary particles in the base rubber hardly occurs.

(b) The spherical silica secondary particles are preferably porous. If (b) the spherical silica secondary particles are porous, the rubber molecule constituting the base rubber is adsorbed by the silica secondary particles, and thus the interfacial strength between the rubber and the silica secondary particles is enhanced and the tan δ becomes higher. In the case that (b) the spherical silica secondary particles are porous, the pore volume thereof is preferably more than 0.05 ml/g, more preferably 0.5 ml/g or more, and even more preferably 1.0 ml/g or more, and is preferably 2.5 ml/g or less, more preferably 2.3 ml/g or less, and even more preferably 2.0 ml/g or less. If the pore volume is more than 0.05 ml/g, the rubber molecule constituting the base rubber is easily adsorbed by the silica particles, and if the pore volume is 2.5 ml/g or less, breaking of the spherical silica secondary particles is suppressed when kneading the rubber composition in which (b) the spherical silica secondary particles have been added.

The method for preparing (b) the spherical silica secondary particles is not particularly limited, and examples thereof include a method of drying a silica sol with a spray dryer, a method of emulsifying a silicic acid alkali aqueous solution and an organic solvent to form a W/O emulsion followed by gelling droplets of the silicic acid alkali aqueous solution, and the like.

As (b) the spherical silica secondary particles, a commercial product may be used, and examples of the commercial product include SUNSPHERE (registered trademark) H-31, H-32, H-33, H-51, H-52, H-53, H-121, H-122, H-201, L-31, L-51 (these products are available from AGC Si-Tech Co., Ltd.), and the like.

The amount of (b) the spherical silica secondary particles in the surface layer rubber composition is preferably 1 part by mass or more, more preferably 5 parts by mass or more, and even more preferably 8 parts by mass or more, and is preferably 30 parts by mass or less, more preferably 25 parts by mass or less, and even more preferably 20 parts by mass or less, with respect to 100 parts by mass of (a) the base rubber. If the amount of (b) the spherical silica secondary particles is 1 part by mass or more, the grip has better anti-slipping performance, and if the amount of (b) the spherical silica secondary particles is 30 parts by mass or less, the grip can maintain light weight.

(c) Silane Coupling Agent (c) The silane coupling agent improves the dispersibility of (b) the spherical silica secondary particles in (a) the base rubber. The type of (c) the silane coupling agent is not particularly limited, and the conventional silane coupling agent may be used. (c) The silane coupling agent may be used solely, or two or more of them may be used in combination. Examples of (c) the silane coupling agent include the compounds represented by the following formulae (1) and (2).

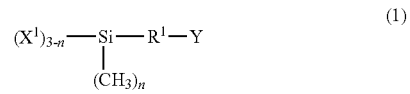

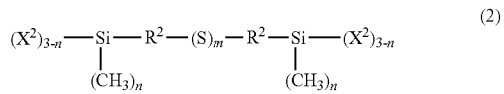

[In the formulae (1) and (2), $X^1$ and $X^2$ independently represent a methoxy group, an ethoxy group or a 2-methoxy ethoxy group, $R^1$ and $R^2$ independently represent an ethylene group or a propylene group, Y represents an amino group, a vinyl group, a methacryloxy group, an acryloxy group, a mercapto group, an isocyanate group, an ureido group, an epoxy group or a glycidoxy group, n represents 0 or 1, and m represents 2, 3 or 4.]

Examples of the silane coupling agent represented by the formula (1) include vinyltrimethoxysilane, vinyltriethoxysilane, 3-methacryloxypropyltrimethoxysilane, 3-methacryloxypropyltriethoxysilane, 3-mercaptopropyltrimethoxysilane, 3-isocyanate propyltriethoxysilane, 3-ureidepropyltrimethoxysilane, 3-glycidoxypropyltrimethoxysilane and the like. Preferable examples of the silane coupling agent represented by the formula (2) include bis(3-triethoxysilyl propyl) disulfide and bis(3-triethoxysilyl propyl) tetrasulfide. As (c) the silane coupling agent, the silane coupling agent represented by the formula (2) is preferred, and bis(3-triethoxysilyl propyl) disulfide and bis (3-triethoxysilyl propyl) tetrasulfide are more preferred.

The amount of (c) the silane coupling agent in the surface layer rubber composition is preferably 0.1 part by mass or more, more preferably 0.2 part by mass or more, and even more preferably 0.4 part by mass or more, and is preferably 2.5 parts by mass or less, more preferably 2.0 parts by mass or less, and even more preferably 1.5 parts by mass or less, with respect to 100 parts by mass of (a) the base rubber. If the amount of (c) the silane coupling agent is 0.1 part by mass or more, the effect of (c) the silane coupling agent is larger and the rubber composition has larger tan δ, and if the amount of (c) the silane coupling agent is 2.5 parts by mass or less, lowering in the anti-slipping performance caused by the bleeding out of the silane coupling agent in the molded grip is suppressed.

The amount of (c) the silane coupling agent in the surface layer rubber composition is preferably 0.1 part by mass or more, more preferably 2.5 parts by mass or more, and even more preferably 5 parts by mass or more, and is preferably 30 parts by mass or less, more preferably 25 parts by mass or less, and even more preferably 20 parts by mass or less, with respect to 100 parts by mass of (b) the spherical silica secondary particles. If the amount of (c) the silane coupling agent is 0.1 part by mass or more, the effect of (c) the silane coupling agent is larger and the rubber composition has larger tan δ, and if the amount of (c) the silane coupling agent is 30 parts by mass or less, all of (c) the silane coupling agent is utilized for the coupling, and thus no lowering in the anti-slipping performance caused by the bleeding out of the silane coupling agent in the molded grip occurs.

(Crosslinking Agent)

The surface layer rubber composition further contains a crosslinking agent in addition to (a) the base rubber, (b) the spherical silica secondary particles and (c) the silane coupling agent. As the crosslinking agent, a sulfur based crosslinking agent and an organic peroxide may be used. Examples of the sulfur based crosslinking agent include an elemental sulfur and a sulfur donor type compound. Examples of the elemental sulfur include powdery sulfur, precipitated sulfur, colloidal sulfur, and insoluble sulfur. Examples of the sulfur donor type compound include 4,4'-dithiobismorpholine. Examples of the organic peroxide include dicumyl peroxide, α,α'-bis(t-butylperoxy-m-diisopropyl) benzene, 2,5-dimethyl-2,5-di(t-butylperoxy) hexane, 1,1-bis(t-butylperoxy)-3,3,5-trimethylcyclohexane, and the like. The crosslinking agent may be used solely, or two or more of them may be used in combination. As the crosslinking agent, the sulfur based crosslinking agent is preferred, and the elemental sulfur is more preferred. The amount of the crosslinking agent is preferably 0.2 part by mass or more, more preferably 0.4 part by mass or more, and even more preferably 0.6 part by mass or more, and is preferably 4.0 parts by mass or less, more preferably 3.5 parts by mass or less, and even more preferably 3.0 parts by mass or less, with respect to 100 parts by mass of (a) the base rubber.

The surface layer rubber composition preferably further contains a vulcanization accelerator or a vulcanization activator.

(Vulcanization Accelerator)

Examples of the vulcanization accelerator include thiurams such as tetramethylthiuram disulfide (TMTD), tetrabenzylthiuram disulfide (TBzTD), tetramethylthiuram monosulfide (TMTM), and dipentamethylenethiuram tetrasulfide; guanidines such as diphenylguanidine (DPG); dithiocarbamates such as zinc dimethyldithiocarbamate (ZnPDC), and zinc dibutyldithiocarbamate; thioureas such as trimethylthiourea, and N,N'-diethylthiourea; thiazoles such as mercaptobenzothiazole (MBT), and benzothiazole disulfide; sulfenamides such as N-cyclohexyl-2-benzothiazolylsulfenamide (CBS), and N-t-butyl-2-benzothiazolylsulfenamide (BBS); and the like. These vulcanization accelerators may be used solely, or two or more of them may be used in combination. The total amount of the vulcanization accelerator is preferably 0.4 part by mass or more, more preferably 0.8 part by mass or more, and even more preferably 1.2 parts by mass or more, and is preferably 8.0 parts by mass or less, more preferably 7.0 parts by mass or less, and even more preferably 6.0 parts by mass or less, with respect to 100 parts by mass of (a) the base rubber.

(Vulcanization Activator)

Examples of the vulcanization activator include a metal oxide, a metal peroxide, and a fatty acid. Examples of the metal oxide include zinc oxide, magnesium oxide, and lead oxide. Examples of the metal peroxide include zinc peroxide, chromium peroxide, magnesium peroxide, and calcium peroxide. Examples of the fatty acid include stearic acid, oleic acid, and palmitic acid. These vulcanization activators may be used solely, or two or more of them may be used in combination. The total amount of the vulcanization activator is preferably 0.5 part by mass or more, more preferably 0.6 part by mass or more, and even more preferably 0.7 part by mass or more, and is preferably 10.0 parts by mass or less, more preferably 9.5 parts by mass or less, and even more preferably 9.0 parts by mass or less, with respect to 100 parts by mass of the base rubber.

The surface layer rubber composition may further contain a reinforcing material, antioxidant, softening agent, coloring agent, antiscorching agent, resin or the like, where necessary.

Examples of the reinforcing material include carbon black and the like. The amount of the reinforcing material is preferably 2.0 parts by mass or more, more preferably 3.0 parts by mass or more, and even more preferably 4.0 parts by mass or more, and is preferably 50 parts by mass or less, more preferably 45 parts by mass or less, and even more preferably 40 parts by mass or less, with respect to 100 parts by mass of (a) the base rubber.

Examples of the antioxidant include imidazoles, amines, phenols and thioureas. Examples of the imidazoles include nickel dibutyldithiocarbamate (NDIBC), 2-mercaptobenzimidazole, and zinc salt of 2-mercaptobenzimidazole. Examples of the amines include phenyl-α-naphtylamine. Examples of the phenols include 2,2'-methylene bis(4-methyl-6-t-butylphenol) (MBMBP), and 2,6-di-tert-butyl-4-methylphenol. Examples of the thioureas include tributyl thiourea, and 1,3-bis(dimethylaminopropyl)-2-thiourea. These antioxidants may be used solely, or two or more of them may be used in combination. The amount of the antioxidant is preferably 0.2 part by mass or more, more preferably 0.3 part by mass or more, and even more preferably 0.4 part by mass or more, and is preferably 5.0 parts by mass or less, more preferably 4.8 parts by mass or less, and even more preferably 4.6 parts by mass or less, with respect to 100 parts by mass of (a) the base rubber.

Examples of the softening agent include a mineral oil and a plasticizer. Examples of the mineral oil include paraffin oil, naphthene oil, and aromatic oil. Examples of the plasticizer include dioctyl phthalate, dibutyl phthalate, dioctyl sebacate, and dioctyl adipate.

Examples of the antiscorching agent include an organic acid and a nitroso compound. Examples of the organic acid include phthalic anhydride, pyromellitic anhydride, trimellitic anhydride, benzoic acid, salicylic acid, and malic acid. Examples of the nitroso compound include N-nitrosodiphenylamine, N-(cyclohexylthio) phthalimide, sulfonamide derivative, diphenyl urea, bis(tridecyl)pentaerythritol diphosphite, and 2-mercaptobenzimidazole.

Examples of the resin include a hydrogenated rosin ester, disproportionated rosin ester, ethylene-vinyl acetate copolymer, coumarone resin, phenol resin, xylene resin, and styrene resin.

The surface layer rubber composition may be prepared by a conventionally known method, for example, by kneading raw materials with a kneading machine such as Banbury mixer, kneader, and open roll. It is noted that when the surface layer rubber composition contains microballoons which will be described later, it is preferred that other components than the microballoons are kneaded in advance followed by kneading the kneaded product and the microballoons. The material temperature when kneading the kneaded product and the microballoons is preferably set to be lower than the expansion starting temperature of the microballoons.

The outermost surface layer may be a solid layer or a porous layer. If the outermost surface layer is a porous layer, the golf club grip has light weight. The porous layer is a layer having numerous fine pores (voids) formed in a rubber which is a base material. If numerous fine pores are formed therein, the outermost surface layer has a small apparent density, and thus has light weight.

Examples of the method for preparing the porous layer include a balloon foaming method, chemical foaming method, supercritical carbon dioxide injection molding method, salt extraction method, and solvent removing method. In the balloon foaming method, microballoons are allowed to be included in the rubber composition, and then be expanded by heating to perform foaming. In addition, expanded microballoons may be blended in the rubber composition, and then the resultant rubber composition is molded. In the chemical foaming method, a foaming agent (such as azodicarbonamide, azobisisobutyronitrile, N,N'-dinitrosopentamethylene tetramine, p-toluenesulfonyl hydrazine, and p-oxybis(benzenesulfono hydrazide)) or a foaming auxiliary agent is allowed to be included in the rubber composition, and then a gas (such as carbon dioxide gas and nitrogen gas) is generated by a chemical reaction to perform foaming. In the supercritical carbon dioxide injection molding method, the rubber composition is immersed in carbon dioxide being in a supercritical state at a high pressure, the resultant rubber composition is injected at a normal pressure, and the carbon dioxide is gasified to perform foaming. In the salt extraction method, a readily soluble salt (such as boric acid and calcium chloride) is allowed to be included in the rubber composition, and then the salt is dissolved and extracted therefrom after molding to form fine pores. In the solvent removing method, a solvent is allowed to be included in the rubber composition, and then the solvent is removed therefrom after molding to form fine pores.

When the outermost surface layer is a porous layer, a foamed layer formed from a surface layer rubber composition containing a foaming agent is preferred. In particular, a foamed layer prepared by the balloon foaming method is preferred. In other words, the outermost surface layer is preferably a foamed layer formed from a surface layer rubber composition containing microballoons. If the microballoons are used, the outermost surface layer has light weight while maintaining the mechanical strength thereof.

As the microballoons, either organic microballoons or inorganic microballoons may be used. Examples of the organic microballoons include hollow particles formed from a thermoplastic resin, and resin capsules encapsulating a hydrocarbon with a low boiling point in a shell formed from a thermoplastic resin. Specific examples of the resin capsules include Expancel available from Akzo Nobel Company, and Matsumoto Microsphere (registered trademark) available from Matsumoto Yushi Seiyaku Co., Ltd. Examples of the inorganic microballoons include hollow glass particles (such as silica balloons and alumina balloons), and hollow ceramic particles.

The volume average particle size of the resin capsules (before expansion) is preferably 5 μm or more, more preferably 6 μm or more, and even more preferably 9 μm or more, and is preferably 90 μm or less, more preferably 70 μm or less, and even more preferably 60 μm or less.

When the outermost surface layer is prepared by the balloon foaming method, the amount of the microballoons in the surface layer rubber composition is preferably 1.0 part by mass or more, more preferably 1.2 parts by mass or more, and even more preferably 1.5 parts by mass or more, and is preferably 10 parts by mass or less, more preferably 8 parts by mass or less, and even more preferably 6 parts by mass or less, with respect to 100 parts by mass of the base rubber. If the amount of the microballoons is 1.0 part by mass or more, foaming is more uniform when forming the porous layer, and if the amount of the microballoons is 10 parts by mass or less, the porous layer strikes a good balance between the light weight and the mechanical strength.

In addition, the foaming ratio of the outermost surface layer prepared by the balloon foaming method is preferably 1.1 or more, more preferably 1.2 or more, and is preferably 2.0 or less, more preferably 1.8 or less, and even more preferably 1.5 or less. If the foaming ratio is 1.1 or more, the grip shows a greater effect of reducing the weight, and if the foaming ratio is 2.0 or less, lowering in the mechanical strength of the outermost surface layer can be suppressed.

When the outermost surface layer is a porous layer, the density ($D_{out}$) of the outermost surface layer is preferably 0.6 g/cm$^3$ or more, more preferably 0.65 g/cm$^3$ or more, and even more preferably 0.7 g/cm$^3$ or more, and is preferably 1.1 g/cm$^3$ or less, more preferably 1.05 g/cm$^3$ or less, and even more preferably 1.0 g/cm$^3$ or less. If the density of the outermost surface layer is 0.6 g/cm$^3$ or more, the surface layer has better abrasion resistance, and if the density of the outermost surface layer is 1.1 g/cm$^3$ or less, the effect of reducing the weight of the grip by the porous layer becomes greater.

The material hardness (Shore A hardness) of the surface layer rubber composition is preferably 30 or more, more preferably 40 or more, and even more preferably 45 or more, and is preferably 80 or less, more preferably 70 or less, and even more preferably 60 or less. If the material hardness (Shore A hardness) of the surface layer rubber composition is 30 or more, the outermost surface layer has further enhanced mechanical strength, and if the material hardness (Shore A hardness) of the surface layer rubber composition is 80 or less, the outermost surface layer does not become excessively hard and thus the grip feeling when holding the grip becomes better.

The tan δ of the surface layer rubber composition is preferably 1.15 or more, more preferably 1.20 or more, and even more preferably 1.25 or more, and is preferably 3.0 or less, more preferably 2.5 or less, and even more preferably 2.0 or less. If the tan δ is 1.15 or more, the grip has better anti-slipping performance under a wet condition, and if the tan δ is 3.0 or less, the grip is more flexible.

[Other Portion]

The material for forming other portion of the golf club grip than the portion formed from the above surface layer rubber composition is not particularly limited. Examples of the composition for forming the other portion (hereinafter, sometimes referred to as "inner layer composition") include a rubber composition and a resin composition.

The rubber composition preferably contains a base rubber and a crosslinking agent. Examples of the base rubber include natural rubber (NR), ethylene-propylene-diene rubber (EPDM), butyl rubber (IIR), acrylonitrile-butadiene rubber (NBR), hydrogenated acrylonitrile-butadiene rubber (HNBR), carboxyl-modified acrylonitrile-butadiene rubber (XNBR), carboxyl-modified hydrogenated acrylonitrile-butadiene rubber (HXNBR), butadiene rubber (BR), styrene-butadiene rubber (SBR), polyurethane rubber (PU), isoprene rubber (IR), chloroprene rubber (CR), and ethylene-propylene rubber (EPM). Among them, NR, EPDM, IIR, NBR, HNBR, XNBR, HXNBR, BR, SBR, and PU are preferred as the base rubber.

Examples of the crosslinking agent used in the rubber composition include the same one as those employed in the surface layer rubber composition, and the elemental sulfur is preferred. The rubber composition preferably further contains a vulcanization accelerator and a vulcanization activator. Examples of these vulcanization accelerator and vulcanization activator include the same one as those employed in the surface layer rubber composition. As the vulcanization accelerator, N-t-butyl-2-benzothiazolylsulfenamide and tetrabenzylthiuram disulfide are preferred. As the vulcanization activator, zinc oxide and stearic acid are preferred.

The rubber composition may further contain a reinforcing material, antioxidant, softening agent, coloring agent, antiscorching agent and the like, where necessary. Examples of the reinforcing material, antioxidant and coloring agent include the same one as those employed in the surface layer rubber composition. As the reinforcing material, carbon black and silica are preferred. As the antioxidant, 2,2'-methylene bis(4-methyl-6-t-butylphenol) is preferred.

The rubber composition may be prepared by a conventionally known method, for example, by kneading raw materials with a kneading machine such as Banbury mixer, kneader, and open roll. The temperature (material temperature) when performing the kneading preferably ranges from 70° C. to 160° C. It is noted that when the rubber composition contains microballoons, the kneading is preferably performed at a temperature lower than the expansion starting temperature of the microballoons.

The resin composition contains a base resin. Examples of the base resin include a polyurethane resin, polystyrene resin, polyethylene resin, polypropylene resin, ethylene-vinyl acetate copolymer resin, and polyethylene terephthalate resin.

The composition for forming the other portion is preferably the rubber composition, and preferably contains natural rubber (NR), ethylene-propylene-diene rubber (EPDM) or butyl rubber (IIR) as the base rubber. In addition, the rubber composition for forming the other portion also preferably contains the acrylonitrile-butadiene based rubber. If the composition for forming the other portion contains the acrylonitrile-butadiene based rubber, adhesion between the portion formed from the surface layer rubber composition and the other portion is enhanced.

The other portion may be solid or porous. In the case that the other portion is porous, the other portion preferably has a foamed construction formed from a rubber composition containing microballoons. If the microballoons are used, the formed portion has light weight while maintaining the mechanical strength thereof. Examples of the microballoons include the same one as those employed in the above surface layer rubber composition, and the resin capsules encapsulating a hydrocarbon with a low boiling point in a shell formed from a thermoplastic resin is preferred.

[Construction]

The shape of the golf club grip is not particularly limited, and a golf club grip having a cylindrical portion is preferred. If the golf club grip has a cylindrical portion, a shaft or the like can be inserted into the cylindrical portion. Further, the cylindrical portion may have either a single-layered construction or a multi-layered construction. When the cylindrical portion has a single-layered construction, the whole cylindrical portion is formed from the above surface layer rubber composition. When the cylindrical portion has a multi-layered construction, at least a part of or whole parts of the outermost surface layer is formed from the above surface layer rubber composition.

The thickness of the cylindrical portion is preferably 0.5 mm or more, more preferably 1.0 mm or more, and even more preferably 1.5 mm or more, and is preferably 17.0 mm or less, more preferably 10.0 mm or less, and even more preferably 8.0 mm or less. The cylindrical portion may be formed with a fixed thickness along the axis direction thereof, or may be formed with a thickness gradually becoming thicker from the front end toward the back end.

The golf club grip preferably has a dual-layered cylindrical portion composed of a cylindrical inner layer and a cylindrical outer layer covering the cylindrical inner layer. If the cylindrical portion has a dual-layered construction, the mechanical properties of the cylindrical portion are easily controlled. It is preferred that at least a part of the cylindrical outer layer is formed from the above surface layer rubber composition, and it is more preferred that the whole cylindrical outer layer is formed from the above surface layer rubber composition.

The cylindrical outer layer and the cylindrical inner layer may have a uniform thickness, or may have a varied thickness. For example, the cylindrical outer layer and the cylindrical inner layer may be formed with a thickness gradually becoming thicker from one end toward another end along the axis direction of the cylindrical grip. The cylindrical outer layer preferably has a uniform thickness.

When the cylindrical portion has a thickness in a range from 0.5 mm to 17.0 mm, the thickness of the cylindrical outer layer is preferably 0.5 mm or more, more preferably 0.6 mm or more, and even more preferably 0.7 mm or more, and is preferably 2.5 mm or less, more preferably 2.3 mm or less, and even more preferably 2.1 mm or less. If the thickness of the cylindrical outer layer is 0.5 mm or more, the reinforcing effect by the outer layer material becomes greater, and if the thickness of the cylindrical outer layer is 2.5 mm or less, the cylindrical inner layer can be relatively thickened and thus the effect of reducing the weight of the grip becomes greater.

The percentage ((thickness of cylindrical outer layer/thickness of cylindrical portion)×100) of the thickness of the cylindrical outer layer to the thickness of the cylindrical portion is preferably 0.5% or more, more preferably 1.0% or more, and even more preferably 1.5% or more, and is preferably 99.0% or less, more preferably 98.0% or less, and even more preferably 97.0% or less. If the above percentage is 0.5% or more, the reinforcing effect by the outer layer material becomes greater, and if the above percentage is 99.0% or less, the cylindrical inner layer can be relatively thickened and thus the effect of reducing the weight of the grip becomes greater.

The material hardness (Shore A hardness) of the inner layer composition is preferably 10 or more, more preferably 15 or more, and even more preferably 20 or more, and is preferably 80 or less, more preferably 70 or less, and even more preferably 60 or less. If the material hardness (Shore A hardness) of the inner layer composition is 10 or more, the cylindrical inner layer does not become excessively soft and thus a tightly fixed touch feeling when holding the grip can be obtained, and if the material hardness (Shore A hardness) of the inner layer composition is 80 or less, the cylindrical inner layer does not become excessively hard and thus the grip feeling when holding the grip becomes better.

The material hardness $H_{out}$ (Shore A hardness) of the surface layer rubber composition is preferably equal to or larger than the material hardness $H_{in}$ (Shore A hardness) of the inner layer composition. In this case, the hardness difference between them ($H_{out}-H_{in}$) (Shore A hardness) is preferably 0 or more, more preferably 10 or more, and even more preferably 20 or more, and is preferably 65 or less, more preferably 60 or less, and even more preferably 55 or less. If the above hardness difference ($H_{out}-H_{in}$) falls within the above range, the grip feeling when holding the grip becomes better.

The density ($D_{in}$) of the cylindrical inner layer is preferably smaller than the density ($D_{out}$) of the cylindrical outer layer ($D_{in}<D_{out}$). If such the construction is adopted, the resultant grip has a greater strength and lighter weight.

Examples of the combination of the cylindrical outer layer and the cylindrical inner layer include a combination of a solid outer layer and a solid inner layer, a combination of a solid outer layer and a porous inner layer, and a combination of a porous outer layer and a porous inner layer. Among them, the combination of the solid outer layer and the porous inner layer, and the combination of the porous outer layer and the porous inner layer are preferred. If the inner layer is porous, the grip has light weight but the inner layer has a lowered mechanical strength. However, since the surface layer rubber composition has an excellent mechanical strength, the mechanical strength of the grip can be maintained although the inner layer is porous.

The cylindrical inner layer is preferably a porous layer, and more preferably a foamed layer prepared by the balloon foaming method. When the cylindrical inner layer is prepared by the balloon foaming method, the amount of the microballoons in the inner layer composition is preferably 5 parts by mass or more, more preferably 8 parts by mass or more, and even more preferably 12 parts by mass or more, and is preferably 20 parts by mass or less, more preferably 18 parts by mass or less, and even more preferably 15 parts by mass or less, with respect to 100 parts by mass of the base material (base rubber or base resin). If the amount of the microballoons is 5 parts by mass or more, the effect of reducing the weight of the grip becomes greater, and if the amount of the microballoons is 20 parts by mass or less, lowering in the mechanical strength of the cylindrical inner layer can be suppressed.

In addition, the foaming ratio of the cylindrical inner layer prepared by the balloon foaming method is preferably 1.2 or more, more preferably 1.5 or more, and even more preferably 1.8 or more, and is preferably 5.0 or less, more preferably 4.5 or less, and even more preferably 4.0 or less. If the foaming ratio is 1.2 or more, the effect of reducing the weight of the grip becomes greater, and if the foaming ratio is 5.0 or less, lowering in the mechanical strength of the cylindrical inner layer can be suppressed.

When both the cylindrical outer layer and the cylindrical inner layer are foamed layers, it is preferred that the foaming ratio of the cylindrical outer layer is lower than the foaming ratio of the cylindrical inner layer. Further, in this case, the ratio of the foaming ratio of the cylindrical inner layer to the foaming ratio of the cylindrical outer layer (cylindrical inner layer/cylindrical outer layer) is preferably 1.1 or more, more preferably 1.5 or more, and even more preferably 2.0 or more, and is preferably 10.0 or less, more preferably 9.0 or less, and even more preferably 8.0 or less.

When the cylindrical inner layer is a porous layer, the density ($D_{in}$) of the cylindrical inner layer is preferably 0.20 g/cm$^3$ or more, more preferably 0.22 g/cm$^3$ or more, and even more preferably 0.25 g/cm$^3$ or more, and is preferably 0.50 g/cm$^3$ or less, more preferably 0.48 g/cm$^3$ or less, and even more preferably 0.45 g/cm$^3$ or less. If the density of the cylindrical inner layer is 0.20 g/cm$^3$ or more, the cylindrical inner layer does not excessively deform and thus a stronger hitting feeling can be obtained, and if the density of the cylindrical inner layer is 0.50 g/cm$^3$ or less, the effect of reducing the weight of the grip by the porous layer becomes greater.

When both the cylindrical inner layer and the cylindrical outer layer are porous layers, the density ratio between them ($D_{out}/D_{in}$) is preferably 1.6 or more, more preferably 1.8 or more, and even more preferably 2.0 or more, and is preferably 4.5 or less, more preferably 4.3 or less, and even more preferably 4.0 or less.

[Adhesive Layer]

The golf club grip may have an adhesive layer between the cylindrical inner layer and the cylindrical outer layer. It is noted that the adhesive layer is preferably a very thin layer with a thickness of about 30 μm or less. Examples of the adhesive constituting the adhesive layer include a vulcanized adhesive (crosslinked adhesive) and a rubber cement. If the adhesive layer is included, peel strength between the cylindrical inner layer and the cylindrical outer layer is higher.

The adhesive composition for forming the adhesive layer preferably contains an olefin based rubber. Examples of the olefin based rubber include ethylene-propylene rubber (EPM), ethylene-propylene-diene rubber (EPDM), butyl rubber (IIR), chlorosulfonated polyethylene (CSM), maleic acid-modified ethylene-propylene rubber (M-EPM), chlorinated polyethylene rubber (CM), and the like. The amount of the olefin based rubber in the rubber component of the adhesive composition is preferably 50 mass % or more.

The olefin based rubber is preferably a modified olefin based rubber. Examples of the modified olefin based rubber include chlorosulfonated polyethylene (CSM), maleic acid-modified ethylene-propylene rubber (M-EPM), chlorinated polyethylene rubber (CM) and the like.

The amount of the modified polyethylene in the modified olefin based rubber is preferably 5 mass % or more, more preferably 7 mass % or more, and even more preferably 10 mass % or more, and is preferably 15 mass % or less, more preferably 12 mass % or less, and even more preferably 10 mass % or less. If the amount of the modified polyethylene is 5 mass % or more, peel strength between the cylindrical inner layer and the cylindrical outer layer is further enhanced, and if the amount of the modified polyethylene is 15 mass % or less, lowering in the tensile strength of the grip is suppressed.

Specific examples of the olefin based rubber include Chemlok 6108, XJ-150, Chemlok 233X, Chemlok 402X and Chemlok 8216 available from Lord Corporation.

The adhesive composition preferably contains 4,4'-diphenylmethane diisocyanate (MDI). If the MDI is contained, peel strength between the cylindrical inner layer and the cylindrical outer layer is further enhanced. The amount of the MDI is preferably more than 0 mass %, more preferably 1 mass % or more, and even more preferably 2 mass % or more, and is preferably 6 mass % or less, more preferably 5 mass % or less, and even more preferably 4 mass % or less.

The adhesive composition may contain a solvent. If the solvent is contained, a thinner adhesive layer can be formed, and thus tensile strength of the grip can be enhanced. Examples of the solvent include an organic solvent such as xylene and toluene. In the case of containing the solvent, the amount of the solid component (the amount of the component other than the solvent) in the adhesive composition preferably ranges from 10 mass % to 30 mass %. Further, the adhesive composition may contain a filler (such as carbon black and silica).

The golf club grip may be obtained by molding the above surface layer rubber composition in a mold. Examples of the molding method include a press molding method and an injection molding method. In addition, the golf club grip comprising an inner layer and an outer layer may be obtained, for example, by press molding a laminated product composed of an unvulcanized rubber sheet formed from the above surface layer rubber composition and an unvulcanized rubber sheet formed from the above inner layer rubber composition in a mold. When the press molding method is adopted, the temperature of the mold preferably ranges from 140° C. to 200° C., the molding time preferably ranges from 5 minutes to 40 minutes, and the molding pressure preferably ranges from 0.1 MPa to 100 MPa.

Examples of the shape of the golf club grip include a shape having a cylindrical portion for inserting a shaft and an integrally molded cap portion for covering the opening of the back end of the cylindrical portion, wherein the outermost surface layer of the cylindrical portion includes the above spherical particle existing region. Further, the outermost surface layer of the cylindrical portion is preferably formed from the surface layer rubber composition containing (a) the base rubber, (b) the spherical silica secondary particles and (c) the silane coupling agent. Furthermore, the cylindrical portion preferably has a laminated construction composed of the inner layer and the outer layer. In this case, the outer layer is formed from the surface layer rubber composition.

The cylindrical portion may be formed with a fixed thickness along the axis direction thereof, or may be formed with a thickness gradually becoming thicker from the front end toward the back end. In addition, the cylindrical portion may be formed with a fixed thickness along the diameter direction thereof, or a projecting strip part (so-called back line) may be formed on a part of the cylindrical portion. Furthermore, grooves may be formed on the surface of the cylindrical portion. Formation of a water film between the hand of the golfer and the grip may be suppressed by the grooves, and thus the grip performance under a wet condition is further enhanced. In addition, in view of the anti-slipping performance and abrasion resistance of the grip, a reinforcing cord may be disposed in the grip.

The mass of the golf club grip is preferably 16 g or more, more preferably 18 g or more, and even more preferably 20 g or more, and is preferably 35 g or less, more preferably 32 g or less, and even more preferably 30 g or less.

The wet μ of the outer layer of the golf club grip is preferably 1.90 or more, more preferably 1.95 or more, and even more preferably 2.0 or more, and is preferably 2.8 or less, more preferably 2.5 or less, and even more preferably 2.3 or less. If the wet μ is 1.9 or more, the grip has better anti-slipping performance under a wet condition, and if the wet μ is 2.8 or less, the same sense of use under a wet condition as that under a dry condition is obtained, and thus a sense of incongruity occurring under a wet condition relative to a dry condition is lowered.

[Golf Club]

The present invention also provides a golf club using the above golf club grip. The golf club comprises a shaft, a head provided on one end of the shaft, and a grip provided on another end of the shaft, wherein the grip is the above-described golf club grip. The shaft can be made of stainless steel or a carbon fiber reinforced resin. Examples of the head include a wood type, utility type, and iron type. The material constituting the head is not particularly limited, and examples thereof include titanium, titanium alloy, carbon fiber reinforcing plastic, stainless steel, maraging steel, and soft iron.

Next, the golf club grip and the golf club will be explained with reference to figures. FIG. 1 is a perspective view showing one example of a golf club grip. A grip 1 comprises a cylindrical portion 2 for inserting a shaft, and an integrally molded cap portion 3 for covering the opening of the back end of the cylindrical portion.

Figure 2:
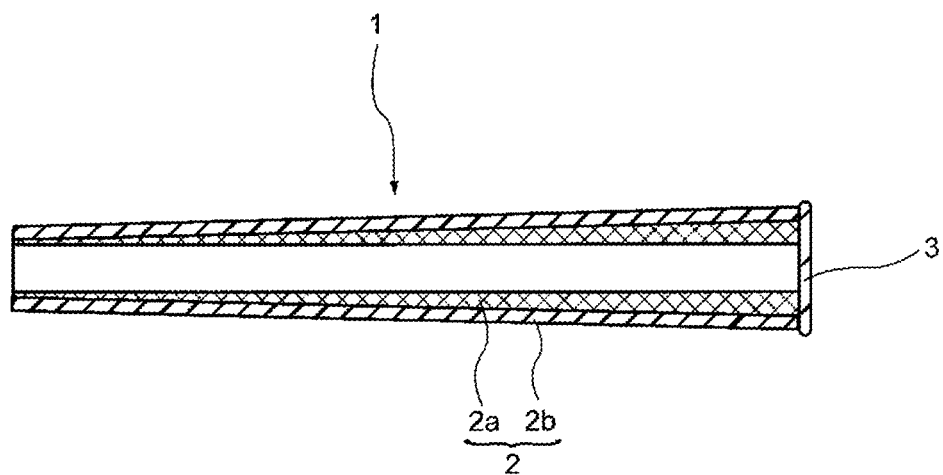
FIG. 2 is a schematic cross-sectional view showing one example of a golf club grip.

FIG. 2 is a schematic cross-sectional view showing one example of a golf club grip. The cylindrical portion 2 is composed of an inner layer 2a and an outer layer 2b. The outer layer 2b is formed with a uniform thickness throughout the entire region from the front end to the back end. The inner layer 2a is formed with a thickness gradually becoming thicker from the front end toward the back end. In the grip 1 shown in FIG. 2, the cap portion 3 is formed from the same rubber composition as that used in the outer layer 2b.

Figure 3:
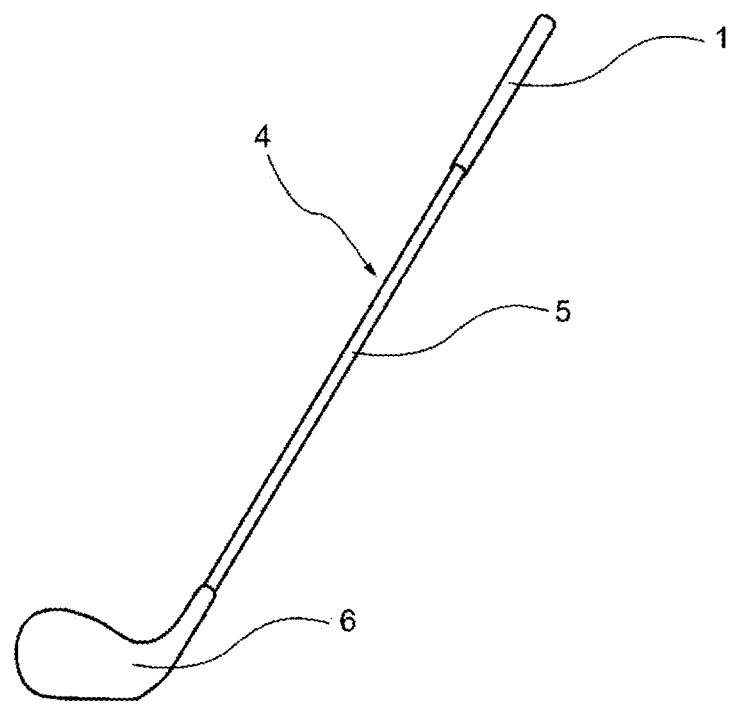
FIG. 3 is a perspective view showing one example of a golf club.

FIG. 3 is a perspective view showing one example of the golf club according to the present invention. A golf club 4 comprises a shaft 5, a head 6 provided on one end of the shaft 5, and a grip 1 provided on another end of the shaft 5. The back end of the shaft 5 is inserted into the cylindrical portion 2 of the grip 1.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Amount of Acrylonitrile

The amount of the acrylonitrile in the acrylonitrile-butadiene rubber before hydrogenation was measured according to ISO 24698-1 (2008).

(2) Amount of Double Bond (mmol/g)

The amount of the double bond was calculated based on the amount (mass %) of the butadiene and the amount (%) of the residual double bond in the copolymer. The amount of the residual double bond means a mass ratio (amount of the double bond after hydrogenation/amount of the double bond before hydrogenation) of the double bond in the copolymer after hydrogenation to the double bond in the copolymer before hydrogenation, and can be measured by infrared spectroscopy. When the acrylonitrile-butadiene rubber is the acrylonitrile-butadiene binary copolymer, the amount of the butadiene in the copolymer is calculated by subtracting the amount (mass %) of the acrylonitrile from 100.

Amount of double bond={amount of butadiene/54}× amount of residual double bond×10

(3) Amount of Monomer Having Carboxyl Group 1 g of the hydrogenated acrylonitrile-butadiene rubber was weighed and dissolved in 50 ml of chloroform, and a thymol blue indicator was dripped therein. 0.05 mol/L sodium hydroxide methanol solution was dripped into the solution while stirring the solution, and the dripping amount (V ml) at the time the solution color initially changed was recorded. For a blank, i.e. 50 ml of chloroform in which no hydrogenated acrylonitrile-butadiene rubber was contained, the thymol blue was used as the indicator, 0.05 mol/L sodium hydroxide methanol solution was dripped into the solution, and the dripping amount (B ml) at the time the solution color initially changed was recorded. The amount of the monomer having the carboxyl group was calculated according to the following formula.

Amount of monomer having carboxyl group={0.05× (V−B)×PM}/(10×X)

(In the formula, V: dripping amount (ml) of the sodium hydroxide solution in the test solution, B: dripping amount (ml) of the sodium hydroxide solution in the blank, PM: molecular weight of the monomer having the carboxyl group, and X: valence of the monomer having the carboxyl group.)

(4) Average Sphericity

The photo of the silica particle observed with a microscope (VH-1000 (lens: VH-250R, magnification: 2500, available from KEYENCE Corporation) was taken. Based on the obtained image, sphericities of at least 10 particles were measured and the average sphericity was calculated. It is noted that the sphericity of each particle was obtained by calculating a ratio (shortest diameter/longest diameter) of the shortest diameter of the particle to the longest diameter of the particle.

(5) Number Average Particle Size

The number average particle size was measured with a wet flow type particle size & shape analyzer (FPIA-3000Sd available from Sysmex Corporation).

(6) Pore Volume

The pore volume was measured by a method based on an adsorption isothermal curve of nitrogen gas according to JIS K1150 (1994).

(7) Observation with Scanning Electron Microscope (SEM)

The photo of the outermost surface layer of the grip observed with a scanning electron microscope was taken. Based on the obtained image, the particle size and sphericity of the silica particle existing in a given range were measured, and the number of the spherical silica particle with a particle size of 3 μm or more existing at 1 mm$^2$ was counted.

(8) Material Hardness (Shore A Hardness)

Sheets with a thickness of 2 mm were prepared by pressing the rubber composition at 160° C. for 8 to 20 minutes. It is noted that, in the case that the rubber composition contains the microballoons, the sheets were prepared by expanding the microballoons at the same foaming ratio as that when forming the grip. These sheets were stored at 23° C. for two weeks. Three of these sheets were stacked on one another so as not to be affected by the measuring base on which the sheets were placed, and the hardness of the stack was measured with an automatic hardness tester (Digitest II, available from Bareiss company) using a testing device of "Shore A".

(9) Foaming Ratio

The foamed layer which was the measuring sample, was cut from the grip, and the density (d1) of the foamed layer was measured. Further, an unfoamed rubber sheet was produced by using the rubber composition used for forming this foamed layer, and the density (d2) of the rubber sheet was measured. The foaming ratio (d2/d1) was calculated by dividing the density of the unfoamed sheet by the density of the foamed layer. It is noted that the density was measured with an auto gravimeter (SP-GR1 available from MS-TEC Co. Ltd., based on Archimedes' principle).

(10) Tan δ

The tan δ was measured with a dynamic viscoelasticity measuring apparatus (Rheogel-E4000 available from UBM Corporation). A test sample was prepared by pressing the outer layer rubber composition at 160° C. for 15 minutes to prepare a rubber plate, and punching this rubber plate into a given size. The measuring conditions were set as follows: temperature range: −100° C. to 100° C., temperature rising rate: 3° C./min, measuring interval: 3° C., frequency: 10 Hz, jig: stretching, and sample shape: 4 mm in width, 1 mm in thickness and 40 mm in length. The tan δ at 4° C. was calculated based on the obtained viscoelasticity spectrum by the dynamic viscoelasticity measurement.

(11) Wet μ

The wet μ was measured with a dynamic friction tester (TRILAB Master TL201Ts available from Trinity-Lab Inc.). A test sample was prepared by chopping the grip with a parting line, shaving off the inner layer side thereof with a slicer, adjusting the thickness thereof into 2 mm followed by punching it into a square chip with a side length of 1 mm. The measuring conditions were set as follows: load: 25 kg/cm$^2$, testing rate: 1 mm/sec, and testing span: 50 mm.

(12) Hitting Test Under a Wet Condition

A grip of a golf club (XXIO8 (flex: R, loft: 10.5) available from Dunlop Sports Limited) was replaced with the test grip to prepare a test golf club. The grip of the test golf club was made wet followed by performing an actual hitting test with the test golf club to measure the flight distance of a golf ball. In addition, the face angle after the hitting was measured with a measuring system disclosed in Japanese Patent Publication No. 2012-170532 A, when performing the actual hitting test. In Table 3, the face angle and flight distance are shown in a difference from those of the grip No. 9.

[Production of Grip]

According to the formulations shown in Tables 1 and 2, raw materials were kneaded to prepare the outer layer rubber compositions and the inner layer rubber compositions. It is noted that, the outer layer rubber compositions were prepared by kneading all the raw materials with Banbury mixer, and the inner layer rubber compositions were prepared by kneading the other raw materials than the microballoons with Banbury mixer followed by blending the microballoons therein with a roll. The material temperature when kneading the inner layer rubber compositions with the Banbury mixer and the material temperature when blending the microballoons with the roll were lower than the expansion starting temperature of the microballoons.

TABLE 1

| Outer layer rubber composition No. | | | A | B | C | D | E | F | G | H | I |
|---|---|---|---|---|---|---|---|---|---|---|---|
| Formulation (parts by mass) | Base rubber | HXNBR | 100 | 100 | 100 | 100 | 100 | 100 | 100 | 100 | 100 |
| | | NR | — | — | — | — | — | — | — | — | — |
| | | EPDM | — | — | — | — | — | — | — | — | — |
| | | IIR | — | — | — | — | — | — | — | — | — |
| | Silica particle | ULTRASIL VN3 GR | — | — | — | — | — | — | — | — | 8 |
| | | SUNSPHERE H-33 | 8 | 8 | 8 | 8 | — | — | — | — | — |
| | | SUNSPHERE H-31 | — | — | — | — | 8 | — | — | — | — |
| | | SUNSPHERE L-31 | — | — | — | — | — | 8 | — | — | — |
| | | SUNSPHERE H-201 | — | — | — | — | — | — | 8 | — | — |
| | | SUNSPHERE NP-200 | — | — | — | — | — | — | — | 8 | — |

TABLE 1-continued

| | | | | | | | | | | | |
|---|---|---|---|---|---|---|---|---|---|---|---|
| Silane coupling agent | Si 266 | 0.4 | 0.8 | 1.2 | 1.6 | 0.4 | 0.4 | 0.4 | 0.4 | 0.4 |
| Crosslinking agent | Sulfur | 1.5 | 1.5 | 1.5 | 1.5 | 1.5 | 1.5 | 1.5 | 1.5 | 1.5 |
| Vulcanization accelerator | Sanceler TBzTD | 3 | 3 | 3 | 3 | 3 | 3 | 3 | 3 | 3 |
| | NOCCELER EUR | 1 | 1 | 1 | 1 | 1 | 1 | 1 | 1 | 1 |
| | NOCCELER NS | — | — | — | — | — | — | — | — | — |
| | NOCCELER CZ | — | — | — | — | — | — | — | — | — |
| | SOXINOL D | 0.5 | 0.5 | 0.5 | 0.5 | 0.5 | 0.5 | 0.5 | 0.5 | 0.5 |
| Vulcanization activator | STRUKTOL ZP 1014 | 5 | 5 | 5 | 5 | 5 | 5 | 5 | 5 | 5 |
| | Zinc oxide | — | — | — | — | — | — | — | — | — |
| Reinforcing material | SEAST SO | — | — | — | — | — | — | — | — | — |
| | DIABLACK N220 | — | — | — | — | — | — | — | — | — |
| Antioxidant | NOCRAC NS-6 | — | — | — | — | — | — | — | — | — |
| | NOCRAC TBTU | 1 | 1 | 1 | 1 | 1 | 1 | 1 | 1 | 1 |
| Processing aid and modifier | Stearic acid | 1 | 1 | 1 | 1 | 1 | 1 | 1 | 1 | 1 |
| | ADK CIZER RS735 | 5 | 5 | 5 | 5 | 5 | 5 | 5 | 5 | 5 |
| | PW380 | — | — | — | — | — | — | — | — | — |
| | HARITACK SE10 | 20 | 20 | 20 | 20 | 20 | 20 | 20 | 20 | 20 |

| Outer layer rubber composition No. | | | J | K | L | M | N | O | P | Q |
|---|---|---|---|---|---|---|---|---|---|---|
| Formulation (parts by mass) | Base rubber | HXNBR | 100 | 100 | 100 | 100 | 100 | 100 | 100 | — |
| | | NR | — | — | — | — | — | — | — | 70 |
| | | EPDM | — | — | — | — | — | — | — | 30 |
| | | IIR | — | — | — | — | — | — | — | 5 |
| | Silica particle | ULTRASIL VN3 GR | 8 | 8 | 8 | — | — | — | — | 8 |
| | | SUNSPHERE H-33 | — | — | — | 8 | — | — | — | — |
| | | SUNSPHERE H-31 | — | — | — | — | — | — | — | — |
| | | SUNSPHERE L-31 | — | — | — | — | — | — | — | — |
| | | SUNSPHERE H-201 | — | — | — | — | — | — | — | — |
| | | SUNSPHERE NP-200 | — | — | — | — | — | — | — | — |
| Silane coupling agent | Si 266 | | 0.64 | 0.8 | — | — | — | — | — | — |
| Crosslinking agent | Sulfur | | 1.5 | 1.5 | 1.5 | 1.5 | 1.5 | 1.5 | 1.5 | 2.0 |
| Vulcanization accelerator | Sanceler TBzTD | | 3 | 3 | 3 | 3 | 3 | 3 | 3 | — |
| | NOCCELER EUR | | 1 | 1 | 1 | 1 | 1 | 1 | 1 | — |
| | NOCCELER NS | | — | — | — | — | — | — | — | 1 |
| | NOCCELER CZ | | — | — | — | — | — | — | — | 1 |
| | SOXINOL D | | 0.5 | 0.5 | 0.5 | — | — | — | — | 1 |
| Vulcanization activator | STRUKTOL ZP 1014 | | 5 | 5 | 5 | 5 | 5 | 5 | 5 | — |
| | Zinc oxide | | — | — | — | — | — | — | — | 3 |
| Reinforcing material | SEAST SO | | — | — | — | — | 5 | 10 | 20 | — |
| | DIABLACK N220 | | — | — | — | — | — | — | — | 4 |
| Antioxidant | NOCRAC NS-6 | | — | — | — | — | — | — | — | 0.5 |
| | NOCRAC TBTU | | 1 | 1 | 1 | 1 | 1 | 1 | 1 | — |
| Processing aid and modifier | Stearic acid | | 1 | 1 | 1 | 1 | 1 | 1 | 1 | 1 |
| | ADK CIZER RS735 | | 5 | 5 | 5 | 5 | 5 | 5 | 5 | 5 |
| | PW380 | | — | — | — | — | — | — | — | 2 |
| | HARITACK SE10 | | 20 | 20 | 20 | 20 | 20 | 20 | 20 | — |

TABLE 2

| Inner layer rubber composition No. | | | a |
|---|---|---|---|
| Formulation (parts by mass) | Base rubber | NR | 70 |
| | | EPDM | 30 |
| | | IIR | 5 |
| | Silica particle | ULTRASIL VN3 GR | 8 |
| | Crosslinking agent | Sulfur | 2 |
| | Vulcanization accelerator | NOCCELER CZ | 1 |
| | | NOCCELER NS | 1 |
| | | SOXINOL D | 1 |
| | Vulcanization activator | Zinc oxide | 3 |
| | Reinforcing material | DIABLACK N220 | 4 |
| | Antioxidant | NOCRAC NS-6 | 0.5 |
| | Processing aid | Stearic acid | 1 |
| | | PW380 | 2 |
| | Retarder | SANTOGARD PVI | 0.5 |
| | | Benzoic acid | 0.3 |
| | Foaming agent | Microballoons | 12 |

Materials used in Tables 1 and 2 are shown below.

HXNBR: hydrogenated carboxyl-modified acrylonitrile-butadiene rubber (Therban XT VPKA 8889 (amount of residual double bond: 3.5%, amount of acrylonitrile: 33.0 mass %, amount of double bond: 0.40 mmol/g, amount of monomer having carboxyl group: 5.0 mass %) available from Lanxess Corporation)

NR (natural rubber): TSR20

EPDM (ethylene-propylene-diene rubber): ESPRENE (registered trademark) 505A available from Sumitomo Chemical Co., Ltd.

IIR: JSR BUTYL065 available from JSR Corporation

ULTRASIL VN3 GR: granulated silica (amorphous) available from Evonik Co., Ltd.

SUNSPHERE H-33: spherical silica (porous secondary particles with average sphericity of 0.977, number average particle size of 3 µm and pore volume of 2 ml/g) available from AGC Si-Tech Co., Ltd.

SUNSPHERE H-31: spherical silica (porous secondary particles with average sphericity of 0.982, number average particle size of 3 µm and pore volume of 1 ml/g) available from AGC Si-Tech Co., Ltd.

SUNSPHERE L-31: spherical silica (porous secondary particles with average sphericity of 0.978, number average particle size of 3 µm and pore volume of 1 ml/g) available from AGC Si-Tech Co., Ltd.

SUNSPHERE H-201: spherical silica (porous secondary particles with average sphericity of 0.975, number average particle size of 20 μm and pore volume of 1 ml/g) available from AGC Si-Tech Co., Ltd.

SUNSPHERE NP-200: spherical silica (porous secondary particles with average sphericity of 0.980, number average particle size of 20 μm and pore volume of 0.1 ml/g) available from AGC Si-Tech Co., Ltd.

Si 266: bis(3-triethoxysilyl propyl) disulfide available from Evonik Co., Ltd.

Sulfur: 5% oil treated sulfur fine powder (200 mesh) available from Tsurumi Chemical Industry Co., Ltd.

Sanceler (registered trademark) TBzTD: tetrabenzylthiuram disulfide available from Sanshin Chemical Industry Co., Ltd.

NOCCELER (registered trademark) EUR: N,N'-diethylthiourea available from Ouchi Shinko Chemical Industry Co., Ltd.

NOCCELER NS: N-t-butyl-2-benzothiazolylsulfenamide available from Ouchi Shinko Chemical Industry Co., Ltd.

NOCCELER CZ: N-cyclohexyl-2-benzothiazolylsulfenamide available from Ouchi Shinko Chemical Industry Co., Ltd.

SOXINOL D: 1,3-diphenyl guanidine available from Sumitomo Chemical Co., Ltd.

STRUKTOL ZP 1014: a product containing zinc peroxide in an amount of 29 mass % available from Struktol Company Zinc oxide: WHITE SEAL available from PT. INDO LYSAGHT Company SEAST (registered trademark) SO: carbon black available from Tokai Carbon Co., Ltd.

DIABLACK (registered trademark) N220: carbon black available from Mitsubishi Chemical Co., Ltd.

NOCRAC (registered trademark) NS-6: 2,2'-methylene bis(4-methyl-6-t-butylphenol) available from Ouchi Shinko Chemical Industry Co., Ltd.

NOCRAC TBTU: tributyl thiourea available from Ouchi Shinko Chemical Industry Co., Ltd.

Stearic acid: beads stearic acid Tsubaki available from NOF Co., Ltd.

ADK CIZER (registered trademark) RS735: available from ADEKA Corporation

PW380: Diana Process Oil PW380 available from Idemitsu Kosan Co., Ltd.

HARITACK SE10: hydrogenated rosin ester (softening point: 78° C. to 87° C., acid value: 2 mgKOH/g to 10 mgKOH/g) available from Harima Chemicals Group, Inc.

SANTOGARD PVI: N-cyclohexyl thiophthalimide available from Sanshin Chemical Industry Co., Ltd.

Benzoic acid: available from Sigma-Aldrich Corporation

Figure 4:
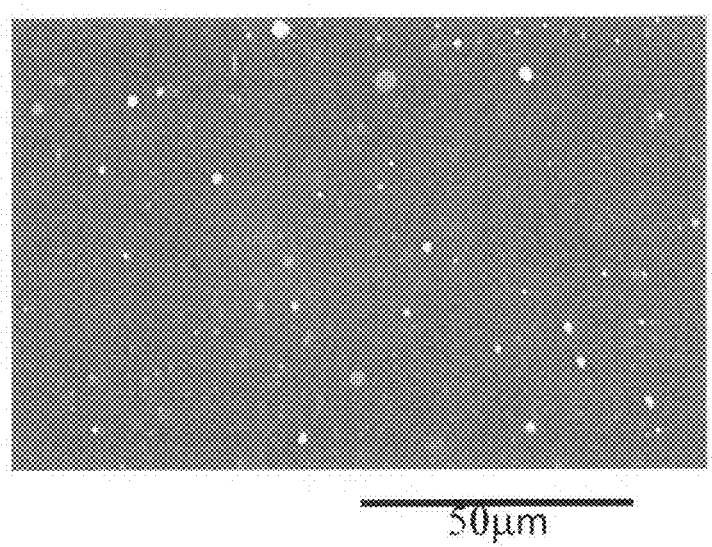
FIG. 4 is a photo showing a SEM image of the grip No. 1.
Figure 5:
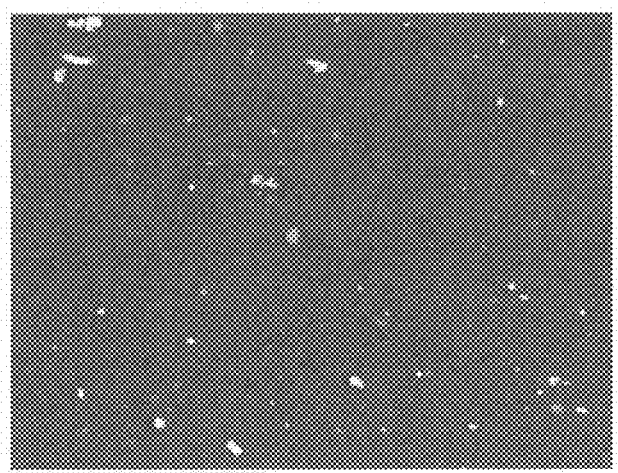
FIG. 5 is a photo showing a SEM image of the grip No. 9.

Microballoons: "Expancel (registered trademark) 909-80DU" (resin capsules encapsulating a hydrocarbon having a low boiling point in a shell formed from a thermoplastic resin, volume average diameter: 18 μm to 24 μm, expansion starting temperature: 120° C. to 130° C.) available from Akzo Nobel Company The unvulcanized rubber sheet having a fan shape and the unvulcanized cap member were prepared from the outer layer rubber composition. It is noted that the outer layer rubber sheet was formed with a fixed thickness. The unvulcanized rubber sheet having a rectangular shape was prepared from the inner layer rubber composition. It is noted that the inner layer rubber sheet was formed with a thickness gradually becoming thicker from one end toward another end. The inner layer rubber sheet was wound around a mandrel, an adhesive composition was applied thereto, and then the outer layer rubber sheet was laminated and wound around thereon. The mandrel provided with these wound rubber sheets, and the cap member were charged into a mold provided with a groove pattern on the cavity surface thereof. Then, heat treatment was carried out at a mold temperature of 160° C. for a heating time of 15 minutes to obtain golf club grips. In the obtained golf club grips, the cylindrical portion had a thickness of 1.5 mm at the thinnest part (the end on the head side), and a thickness of 6.7 mm at the thickest part (the end on the grip end side). Evaluation results for each of the grips are shown in Table 3. In addition, FIG. 4 shows a SEM photo of the Grip No. 1, and FIG. 5 shows a SEM photo of the Grip No. 9.

TABLE 3

| | Grip No. | | 1 | 2 | 3 | 4 | 5 | 6 | 7 | 8 |
|---|---|---|---|---|---|---|---|---|---|---|
| Outer layer | Rubber composition No. | | A | B | C | D | E | F | G | H |
| | Base rubber | HXNBR | 100 | 100 | 100 | 100 | 100 | 100 | 100 | 100 |
| | (parts by mass) | NR | — | — | — | — | — | — | — | — |
| | | EPDM | — | — | — | — | — | — | — | — |
| | | IIR | — | — | — | — | — | — | — | — |
| | Silica particle | ULTRASIL VN3 GR | — | — | — | — | — | — | — | — |
| | (parts by mass) | SUNSPHERE H-33 | 8 | 8 | 8 | 8 | — | — | — | — |
| | | SUNSPHERE H-31 | — | — | — | — | 8 | — | — | — |
| | | SUNSPHERE L-31 | — | — | — | — | — | 8 | — | — |
| | | SUNSPHERE H-201 | — | — | — | — | — | — | 8 | — |
| | | SUNSPHERE NP-200 | — | — | — | — | — | — | — | 8 |
| | Silane coupling agent (parts by mass) | Si 266 | 0.4 | 0.8 | 1.2 | 1.6 | 0.4 | 0.4 | 0.4 | 0.4 |
| | Silica particle | Average sphericity | 0.977 | 0.977 | 0.977 | 0.977 | 0.982 | 0.978 | 0.975 | 0.980 |
| | | Number average particle size (μm) | 3 | 3 | 3 | 3 | 3 | 3 | 20 | 20 |
| | | Pore volume (ml/g) | 2 | 2 | 2 | 2 | 1 | 1 | 1 | 0.1 |
| | | Material hardness (Shore A) | 51 | 51 | 51 | 51 | 51 | 50 | 50 | 46 |
| | | Thickness (mm) | 0.7 | 0.7 | 0.7 | 0.7 | 0.7 | 0.7 | 0.7 | 0.7 |
| | | tan δ | 1.21 | 1.20 | 1.20 | 1.19 | 1.21 | 1.22 | 1.33 | 1.20 |
| | | Spherical secondary particle with a particle size of 3 μm or more (number of particles/mm$^2$) | 505 | 508 | 502 | 505 | 972 | 1065 | 15 | 6 |
| Inner layer | Rubber composition No. | | a | a | a | a | a | a | a | a |
| | Material hardness (Shore A) | | 40 | 40 | 40 | 40 | 40 | 40 | 40 | 40 |
| | Foaming ratio | | 3.5 | 3.5 | 3.5 | 3.5 | 3.5 | 3.5 | 3.5 | 3.5 |
| Evaluation | Grip mass (g) | | 22 | 22 | 22 | 22 | 22 | 22 | 22 | 22 |
| | wet μ | | 1.97 | 1.94 | 1.93 | 1.93 | 1.97 | 1.98 | 2.01 | 1.95 |

TABLE 3-continued

| | | | | | | | | | | |
|---|---|---|---|---|---|---|---|---|---|---|
| Hitting test under a wet condition | Face angle (°) | | 1.3 close | 0.9 close | 0.8 close | 0.8 close | 1.3 close | 1.5 close | 1.6 close | 1.0 close |
| | Flight distance (yds) | | 2.5 | 1.6 | 1.6 | 1.4 | 2.3 | 2.6 | 3.1 | 2.0 |
| | Grip No. | | 9 | 10 | 11 | 12 | 13 | 14 | 15 | 16 | 17 |
| Outer layer | Rubber composition No. | | I | J | K | L | M | N | O | P | Q |
| | Base rubber (parts by mass) | HXNBR | 100 | 100 | 100 | 100 | 100 | 100 | 100 | 100 | — |
| | | NR | — | — | — | — | — | — | — | — | 70 |
| | | EPDM | — | — | — | — | — | — | — | — | 30 |
| | | IIR | — | — | — | — | — | — | — | — | 5 |
| | Silica particle (parts by mass) | ULTRASIL VN3 GR | 8 | 8 | 8 | 8 | — | — | — | — | 8 |
| | | SUNSPHERE H-33 | — | — | — | — | 8 | — | — | — | — |
| | | SUNSPHERE H-31 | — | — | — | — | — | — | — | — | — |
| | | SUNSPHERE L-31 | — | — | — | — | — | — | — | — | — |
| | | SUNSPHERE H-201 | — | — | — | — | — | — | — | — | — |
| | | SUNSPHERE NP-200 | — | — | — | — | — | — | — | — | — |
| | Silane coupling agent (parts by mass) | Si 266 | 0.4 | 0.64 | 0.8 | — | — | — | — | — | — |
| | Silica particle | Average sphericity | 0.716 | 0.716 | 0.716 | 0.716 | 0.977 | — | — | — | — |
| | | Number average particle size (μm) | 63 | 63 | 63 | 63 | 3 | — | — | — | — |
| | | Pore volume (ml/g) | — | — | — | — | 2 | — | — | — | — |
| | Material hardness (Shore A) | | 47 | 48 | 50 | 50 | 51 | 47 | 48 | 53 | 46 |
| | Thickness (mm) | | 0.7 | 0.7 | 0.7 | 0.7 | 0.7 | 0.7 | 0.7 | 0.7 | 0.7 |
| | tan δ | | 1.11 | 1.10 | 1.03 | 1.10 | 1.04 | 0.78 | 0.80 | 0.81 | 0.98 |
| | Spherical secondary particle with a particle size of 3 μm or more (number of particles/mm²) | | 0 | 0 | 0 | 0 | 498 | 0 | 0 | 0 | 0 |
| Inner layer | Rubber composition No. | | a | a | a | a | a | a | a | a | a |
| | Material hardness (Shore A) | | 40 | 40 | 40 | 40 | 40 | 40 | 40 | 40 | 40 |
| | Foaming ratio | | 3.5 | 3.5 | 3.5 | 3.5 | 3.5 | 3.5 | 3.5 | 3.5 | 3.5 |
| Evaluation | Grip mass (g) | | 22 | 22 | 22 | 22 | 22 | 22 | 22 | 23 | 22 |
| | wet μ | | 1.89 | 1.79 | 1.79 | 1.78 | 1.84 | 1.60 | 1.73 | 1.71 | 1.77 |
| | Hitting test under a wet condition | Face angle (°) | 0 | 0.4 open | 0.3 open | 0.7 open | 0.4 open | 3.9 open | 3.1 open | 3.3 open | 0.6 open |
| | | Flight distance (yds) | 0 | −0.9 | −0.7 | −1.1 | −0.8 | −7.4 | −5.6 | −6.0 | −1.2 |

The outer layer (outermost surface layer) of the grips No. 1 to 8 were formed from the rubber composition containing (a) the base rubber, (b) the spherical silica secondary particles and (c) the silane coupling agent. The whole outermost surface layer of the grips No. 1 to 8 was the spherical particle existing region. The grips No. 1 to 8 have high tan δ and wet μ on the surface layer, and thus have excellent grip performance under a wet condition.

The grips No. 9 to 11 are the cases where the rubber composition contains an indefinite shape silica secondary particle. The grips No. 12 to 13 are the cases where the rubber composition does not contain (c) the silane coupling agent. The grips No. 14 to 17 are the cases where the rubber composition does not contain (b) the spherical silica secondary particles and (c) the silane coupling agent but contains carbon black. The outermost surface layer of the grips No. 9 to 12 and 14 to 17 had no spherical particle existing region. The grips No. 9 to 17 have low tan δ and wet μ on the surface layer, and thus have inferior grip performance under a wet condition.

This application is based on Japanese patent application No. 2016-158539 filed on Aug. 12, 2016, the content of which is hereby incorporated by reference.

The invention claimed is:

1. A golf club grip having an outermost surface layer, wherein the outermost surface layer contains (A) a crosslinked rubber and (B) a silica, and has a region where a spherical silica secondary particle with a particle size of 3 μm or more exists in an amount of at least two particles/mm² at least in part of the outermost surface layer,
wherein a base rubber constituting (A) the crosslinked rubber contains at least one member selected from the group consisting of a carboxyl-modified acrylonitrile-butadiene rubber, a hydrogenated acrylonitrile-butadiene rubber and a carboxyl-modified hydrogenated acrylonitrile-butadiene rubber.

2. The golf club grip according to claim 1, wherein the outermost surface layer contains (B) the silica in an amount of 1 part by mass or more and 30 parts by mass or less with respect to 100 parts by mass of a base rubber constituting (A) the crosslinked rubber.

3. A golf club grip having an outermost surface layer, wherein the outermost surface layer contains (A) a crosslinked rubber and (B) a silica, and has a region where a spherical silica secondary particle with a particle size of 3 μm or more exists in an amount of at least two particles/mm² at least in part of the outermost surface layer,
wherein the outermost surface layer has tan δ ranging from 1.15 to 3.0.

4. A golf club grip having an outermost surface layer, wherein the outermost surface layer contains (A) a crosslinked rubber and (B) a silica, and has a region where a spherical silica secondary particle with a particle size of 3 μm or more exists in an amount of at least two particles/mm² at least in part of the outermost surface layer,
wherein the outermost surface layer is formed from a surface layer rubber composition containing (a) a base rubber, (b) spherical silica secondary particles and (c) a silane coupling agent.

5. The golf club grip according to claim 4, wherein (b) the spherical silica secondary particles have an average sphericity of 0.90 or more.

6. The golf club grip according to claim 4, wherein (b) the spherical silica secondary particles have a number average particle size of 1 μm or more and less than 63 μm.

7. The golf club grip according to claim 4, wherein (b) the spherical silica secondary particles are porous and have a pore volume of more than 0.05 ml/g and 2.5 ml/g or less.

8. The golf club grip according to claim 4, wherein the surface layer rubber composition contains (c) the silane coupling agent in an amount of 0.1 part by mass or more and 2.5 parts by mass or less with respect to 100 parts by mass of (a) the base rubber, and in an amount of 0.1 part by mass or more and 30 parts by mass or less with respect to 100 parts by mass of (b) the spherical silica secondary particles.

9. A golf club comprising a shaft, a head provided on one end of the shaft, and a grip provided on another end of the shaft, wherein the grip has an outermost surface layer containing (A) a crosslinked rubber and (B) a silica, and having a region where a spherical silica secondary particle with a particle size of 3 μm or more exists in an amount of at least two particles/mm² at least in part of the outermost surface layer,
wherein a base rubber constituting (A) the crosslinked rubber contains at least one member selected from the group consisting of a carboxyl-modified acrylonitrile-butadiene rubber, a hydrogenated acrylonitrile-butadiene rubber and a carboxyl-modified hydrogenated acrylonitrile-butadiene rubber.

10. The golf club according to claim 9, wherein the outermost surface layer contains (B) the silica in an amount of 1 part by mass or more and 30 parts by mass or less with respect to 100 parts by mass of a base rubber constituting (A) the crosslinked rubber.

11. A golf club comprising a shaft, a head provided on one end of the shaft, and a grip provided on another end of the shaft,
wherein the grip has an outermost surface layer containing (A) a crosslinked rubber and (B) a silica, and having a region where a spherical silica secondary particle with a particle size of 3 μm or more exists in an amount of at least two particles/mm² at least in part of the outermost surface layer, and
wherein the outermost surface layer has tan δ ranging from 1.15 to 3.0.

12. A golf club comprising a shaft, a head provided on one end of the shaft, and a grip provided on another end of the shaft,
wherein the grip has an outermost surface layer containing (A) a crosslinked rubber and (B) a silica, and having a region where a spherical silica secondary particle with a particle size of 3 μm or more exists in an amount of at least two particles/mm² at least in part of the outermost surface layer, and
wherein the outermost surface layer is formed from a surface layer rubber composition containing (a) a base rubber, (b) spherical silica secondary particles and (c) a silane coupling agent.

13. The golf club according to claim 12, wherein (b) the spherical silica secondary particles have an average sphericity of 0.90 or more.

14. The golf club according to claim 12, wherein (b) the spherical silica secondary particles have a number average particle size of 1 μm or more and less than 63 μm.

15. The golf club according to claim 12, wherein (b) the spherical silica secondary particles are porous and have a pore volume of more than 0.05 ml/g and 2.5 ml/g or less.

16. The golf club according to claim 12, wherein the surface layer rubber composition contains (c) the silane coupling agent in an amount of 0.1 part by mass or more and 2.5 parts by mass or less with respect to 100 parts by mass of (a) the base rubber, and in an amount of 0.1 part by mass or more and 30 parts by mass or less with respect to 100 parts by mass of (b) the spherical silica secondary particles.

17. The golf club grip according to claim 4, wherein (c) the silane coupling agent is a compound represented by the formula (1) and/or a compound represented by the formula (2):

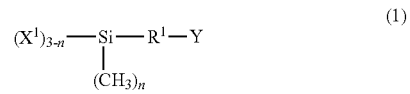

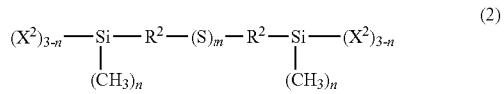

in the formulae (1) and (2), $X^1$ and $X^2$ independently represent a methoxy group, an ethoxy group or a 2-methoxy ethoxy group, $R^1$ and $R^2$ independently represent an ethylene group or a propylene group, Y represents an amino group, a vinyl group, a methacryloxy group, an acryloxy group, a mercapto group, an isocyanate group, a ureido group, an epoxy group or a glycidoxy group, n represents 0 or 1, and m represents 2, 3 or 4.

18. The golf club according to claim 12, wherein (c) the silane coupling agent is a compound represented by the formula (1) and/or a compound represented by the formula (2):

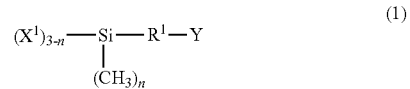

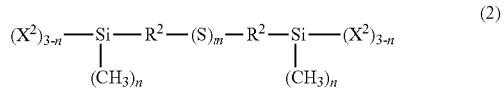

in the formulae (1) and (2), $X^1$ and $X^2$ independently represent a methoxy group, an ethoxy group or a 2-methoxy ethoxy group, $R^1$ and $R^2$ independently represent an ethylene group or a propylene group, Y represents an amino group, a vinyl group, a methacryloxy group, an acryloxy group, a mercapto group, an isocyanate group, a ureido group, an epoxy group or a glycidoxy group, n represents 0 or 1, and m represents 2, 3 or 4.

19. The golf club grip according to claim 3, wherein the outermost surface layer contains (B) the silica in an amount of 1 part by mass or more and 30 parts by mass or less with respect to 100 parts by mass of a base rubber constituting (A) the crosslinked rubber.

20. The golf club according to claim 11, wherein the outermost surface layer contains (B) the silica in an amount of 1 part by mass or more and 30 parts by mass or less with respect to 100 parts by mass of a base rubber constituting (A) the crosslinked rubber.

* * * * *